United States Patent [19]

Hainsworth et al.

[11] Patent Number: 4,942,531
[45] Date of Patent: Jul. 17, 1990

[54] SELF-ADAPTING SIGNAL DETECTOR WITH DIGITAL OUTPUTS

[75] Inventors: Thomas E. Hainsworth, Holland; F. Nicholaas Spanhak, Jennison; Richard R. Paske, Jr., Holland, all of Mich.

[73] Assignee: Bell & Howell Company, Skokie, Ill.

[21] Appl. No.: 194,337

[22] Filed: May 16, 1988

[51] Int. Cl.$^5$ .................................................. G06F 15/50
[52] U.S. Cl. ........................... 364/424.2; 180/169; 180/167
[58] Field of Search .................. 364/424.2, 443; 180/168, 169; 250/202; 318/587

[56] References Cited

U.S. PATENT DOCUMENTS

| | | | |
|---|---|---|---|
| 3,039,554 | 6/1962 | Hosking et al. | 180/168 |
| 3,610,363 | 11/1968 | Hartley et al. | 180/168 |
| 3,933,099 | 1/1976 | Reinhard | 104/88 |
| 4,003,445 | 1/1977 | De Bruine | 180/168 |
| 4,151,526 | 4/1979 | Hinachi et al. | 342/59 |
| 4,219,092 | 8/1980 | Richter | 180/169 |
| 4,328,545 | 5/1982 | Halsall et al. | 364/424.02 |
| 4,345,662 | 8/1982 | Deplante | 180/168 |
| 4,379,497 | 4/1983 | Hainsworth et al. | 180/168 |
| 4,500,970 | 2/1985 | Daemmer | 364/513 |
| 4,530,056 | 7/1985 | MacKinnon et al. | 364/424.2 |
| 4,530,057 | 7/1985 | Ahlbom | 364/424.02 |
| 4,541,049 | 9/1985 | Ahlbom | 364/424.02 |
| 4,566,032 | 1/1986 | Hirooka et al. | 358/103 |
| 4,602,334 | 7/1986 | Salesky | 364/424.02 |
| 4,623,303 | 11/1986 | Kemmer | 180/169 |
| 4,627,511 | 12/1986 | Yajima | 180/167 |
| 4,665,487 | 5/1987 | Ogawa et al. | 364/424.02 |
| 4,703,240 | 10/1987 | Yoshimoto et al. | 318/587 |
| 4,775,023 | 10/1988 | Shimada et al. | 180/168 |
| 4,777,601 | 10/1988 | Boegli | 364/424.2 |
| 4,811,229 | 3/1989 | Wilson | 180/169 |

Primary Examiner—Thomas G. Black
Attorney, Agent, or Firm—Mason, Kolehmainen, Rathburn & Wyss

[57] ABSTRACT

A self-adapting signal detector is adapted to be used with a plurality of guidepath sensors for controlling an automatically guided vehicle. The circuitry detects the presence of a valid guidepath signal over a large dynamic range without the need to make threshold or gain adjustments. A background noise signal is detected as well as a signal from each of the guidepath sensors. The background noise signal is substracted from each sensor signal to define a plurality of difference signals. A maximum remainder signal is defined as the maximum difference signal. Each difference signal is then compared with a predetermined percentage of the maximum remainder signal. Those sensors whose signal level exceeds the predetermined percentage of the maximum remainder signal by a predetermined amount are defined to be a valid guide path signal. The maximum remainder signal is also compared with a predetermined percentage of the background noise signal to determine the signal-to-noise ratio. If the signal-to-noise ratio signal falls below a predetermined value, a signal is provided to stop the vehicle. In an alternate embodiment, the lesser of a predetermined percentage of the maximum remainder signal and a predetermined percentage of the background level is selected to define a reference signal. Those sensors whose signals exceeds the reference signal are defined to be a valid guidepath signal.

17 Claims, 2 Drawing Sheets

SELF-ADAPTING SIGNAL DETECTOR WITH DIGITAL OUTPUTS

A collision avoidance system for an automatically guided vehicle is disclosed in copending application Ser. No. 07/049,584 now U.S. Pat. No. 4,802,096, filed on May 14, 1987, which is assigned to the same assignee as the present application.

BACKGROUND OF THE INVENTION

1. Field of the Invention

This invention relates to circuitry for use with a guidance system for an automatically guided vehicle (AGV) and more specifically to circuitry for detecting the presence of a valid guidepath signal from various types of sensors, such as photocell arrays, infrared light, sound, and the like which operates over a large dynamic range without the need to make gain or threshold adjustments.

2. Description of the Prior Art

Automatically guided vehicles are generally known in the art. Examples of such vehicles are disclosed in the following U.S. Pat. Nos.: 4,328,545; 4,345,662; 3,379,497; 4,623,032; 4,602,334; 4,627,511; 3,039,554; 3,610,363; 3,933,099; 4,003,445; 4,151,526; 4,602,334 and 4,500,970. Such automatically guided vehicles are used in a wide variety of applications, including the transfer of raw materials and subcomponent parts in manufacturing and assembly facilities, the cleaning of floors in warehouses and parking lots and the delivery of mail in business offices. AGVs are also used in a wide variety of applications in the agricultural industry such as, plowing, harvesting, mowing, and the like.

In each application the AGV is guided by on-board sensors which follow a guidepath. Various types of systems are used for automatically guiding the vehicle along a guidepath.

In U.S. Pat. No. 4,003,445, the guidepath consists of a fluorescent material, applied to a floor, carpet or the like which emits visible light in a predetermined frequency range. The fluorescent material, however, is normally invisible under ambient lighting conditions. In this type of guidance system, an ultraviolet light located on the vehicle, irradiates the guidepath. This radiation stimulates the fluorescent materials in the guidepath causing it to emit visible radiation which is sensed by sensors onboard the AGV.

Optical guidance systems for use along a predetermined guidepath are susceptible to spurious operation due to background radiation. Thus, the guidance system must be able to detect a "no-line" situation. Also such systems are affected by the non-uniform intensity of the fluorescent guidepath. The solution to this problem has heretofore been attempted. For example, U.S. Pat. No. 4,003,445 discloses an automatic gain control (AGC) circuit for distinguishing between varying intensities of the reflected light from the fluorescent guidepath and background radiation. In this system, AGC feedback circuitry is disclosed for continuously adjusting the gain of the sensor circuit to compensate for the variations in the guidepath intensity. The AGC circuitry is also coupled to other circuitry for detecting a no-line situation. However, such circuitry is relatively complicated and requires a continuous gain adjustment of the sensor circuit to compensate for the varying intensity of the guidepath.

SUMMARY OF THE INVENTION

It is an object of the present invention to provide a guidance system for an automatically guided vehicle that overcomes many of the problems of the prior art systems.

It is a further object of the present invention to provide a guidance system for an AGV which is operable over a large dynamic range and does not require continuous gain and threshold adjustments.

Briefly, the present invention relates to a guidance system for an automatically guided vehicle which is operable over a wide dynamic range and does not require continuous gain or threshold adjustments. A plurality of guidepath sensors are provided on the vehicle for detecting the presence of a guidepath. An additional sensor is provided for determining the amount of background noise present. The background noise signal is subtracted from each guidepath sensor signal to define a plurality of difference signals. A maximum remainder signal is defined as the maximum difference signal. Each difference signal is then compared with the predetermined percentage of the maximum remainder signal. Those sensors whose signal level exceeds the maximum remainder signal are defined to be a valid guidepath signal. The maximum remainder signal is also compared with the background noise signal to define a signal-to-noise ratio signal. If the signal-to-noise ratio falls below a predetermined value, a signal is provided to stop the vehicle. In an alternate embodiment, the lesser of a predetermined percentage determined percentage of the background level is selected to define a reference signal. Those sensors whose signal exceeds the reference signal are defined to be a valid guidepath signal.

DESCRIPTION OF THE DRAWING

These and other objects and advantages of the present invention will become readily apparent upon consideration of the following detailed description and attached drawing, wherein.

DETAILED DESCRIPTION OF THE INVENTION

Although the following description will focus on an optical guidance system for an automatically guided vehicle, it will be appreciated by those of ordinary skill in the art that the principles of the present invention are also applicable to other types of guidance systems having various types of detectable characteristics, such as radio frequency, ultrasonic waves and the like as generally disclosed in U.S. Pat. Nos. 4,328,545; 4,345,662; 3,933,099; 4,379,497 and 4,500,970.

In an optical guidance system, the guidepath consists of a fluorescent material, applied to a floor, carpet or the like which emits visible light in a predetermined frequency range but which is normally invisible under ambient lighting conditions. An ultraviolet light, located on the vehicle, irradiates the guidepath. The radiation, in turn, stimulates the fluorescent materials in the guidepath causing it to emit visible radiation which is sensed by a plurality of sensors, such as photodiodes or phototransistors, located on the vehicle.

In some known optical systems, the fluorescent material radiates visible light in the blue-green spectrum which may be, for example, approximately between 450 and 500 nanometers when stimulated by invisible ultraviolet radiation at about 360 nanometers. A commonly available and well known fluorescent material, known as "G.E. Green", available from the General Electric Company, is suitable for use as a fluorescent material. A fluorescent material as disclosed in U.S. Pat. No. 4,707,297 is also suitable. Optical filters can also be applied to the sensors for filtering out background light frequencies outside the blue green spectrum.

The guideline is applied to the floor, carpet or the like in any conventional manner. The fluorescent material may be mixed with a suitable liquid carrier, such as alcohol or the like, and applied along the desired guidepath. The liquid material evaporates leaving the fluorescent material as the guideline.

Figure 1:
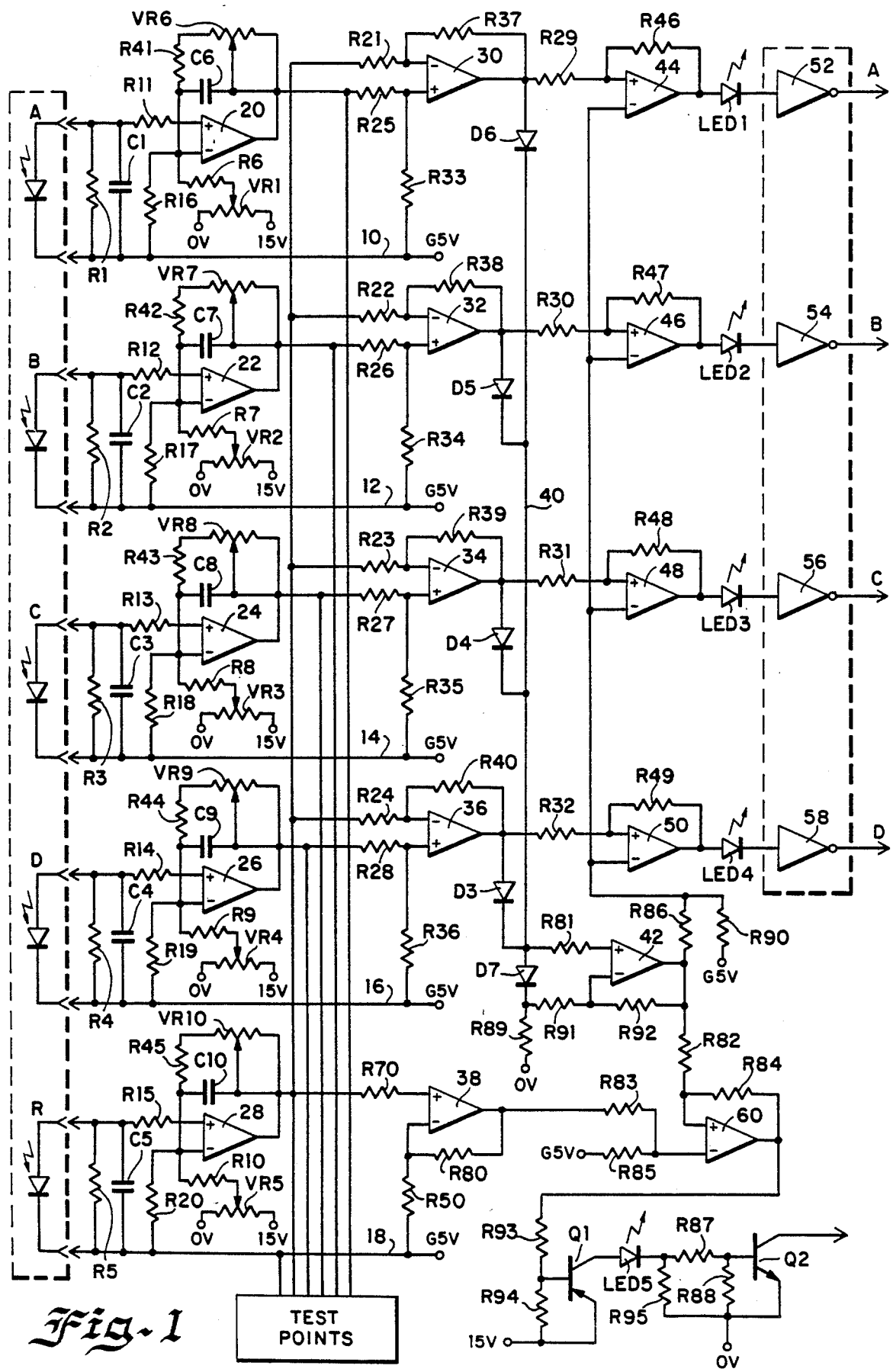
FIG. 1 is a schematic diagram of the self-adapting signal sensor circuit in accordance with the present invention.

FIG. 1 illustrates the use of five sensors. Exemplary photodiodes A, B, C, D and R are shown. The photodiodes A, B, C and D are used to detect the presence of the guidepath. The photodiode R is used to measure the background noise. The circuitry in FIG. 1 compares the signal level from each of the photodiodes A-D with the signal level from the photodiode R which is a measure of the background radiation to develop a difference signal for each of the sensors A, B, C and D. A maximum remainder signal is defined as the maximum difference signal. The maximum signal is then compared with the output signals from each of the photodiodes A, B, C and D. Those photodiodes whose signal level exceeds the predetermined percentage of the maximum remainder signal are defined as valid guidepath signals. Such circuitry is able to detect a valid guidepath signal from each of the photodiodes without the need to continuously adjust the gain or threshold of the circuit.

The photodiodes A-D used to sense guidepath are mounted on the vehicle. As a sensor passes over fluorescent material comprising the guidepath, light is directed toward the photodiode. As long as the photodiode is reverse biased, the light striking the photodiode will cause current to flow through the diode. This current is related to the intensity of the light striking the photodiode. The photodiodes A, B, C, D and R are referenced to a five volt power supply coupled to lines 10, 12, 14, 16 and 18, respectively.

Referring first to the circuitry associated with guide sensor A, the photodiode A is coupled to an operational amplifier 20. Since the output of the photodiode is a current which varies with the intensity of the light striking the diode, the operational amplifier 20 and its associated circuitry converts the output current from the photodiode A to a corresponding voltage at the output of the operational amplifier 20.

In order to correct any offset in the operational amplifier 20 output voltage due to the internal imbalances within the operational amplifier, a voltage biasing circuit is provided. This circuitry comprises a voltage divider circuit which includes a resistor R6, a variable resistor VR1 and a power supply having outputs of 0 volts and 15 volts. More specifically, one end of the resistor R6 is connected to the inverting input of the operational amplifier 20. The other end of the resistor R6 is coupled to a wiper of a variable resistor VR1. The variable resistor VR1 is connected across a DC voltage of 15 volts having one end connected to the 0 volt terminal and the other end connected to a positive 15 volts.

By varying the wiper position of the variable resistor VR1, the output offset voltage due to internal imbalances within the operational amplifier can be adjusted and nulled. A resistor R16, which is coupled between the inverting input of the operational amplifier 20 and the anode of the photodiode A, compensates for any output voltage offset due to offset input current caused by an extremely small amount of current being conducted at the operational amplifier 20 input.

Since photodiode output current is related to the reverse bias voltage across the photodiode, a capacitor C1 is connected across the anode and cathode of the photodiode A to maintain a relatively constant reverse bias voltage across the photodiode A. The capacitor C1 is connected in parallel with a resistor R1. Since the photodiode output current is also related to the amount of external load resistance connected to the photodiode, the value of resistor R1 is selected to optimize the output current.

The operational amplifier 20 is operated with negative feedback. A resistor R41, a variable resistor VR6 and a capacitor C6 comprise the feedback circuit. More specifically, one end of the resistor R41 is serially connected to one end of the variable resistor VR6. The other end of the resistor R41 is coupled to an inverting input of the operational amplifier 20. The other end of the variable resistor VR6 is coupled to the output of the operational amplifier 20. A capacitor C6 is connected in parallel across the serial combination of the resistors R41 and VR6 to reduce noise in the feedback circuit.

The anode of the photodiode A is connected to the noninverting input of operational amplifier 20 via a resistor R11. The cathode of the photodiode A is connected to the inverting input of the operational amplifier 20 via a resistor R16.

The closed loop gain of the operational amplifier 20 is related to the values of the resistors R16 and R41 and the variable resistor VR6. The closed loop gain of the circuit can be adjusted by varying the variable resistor VR6.

The voltage at the output of the operational amplifier 20 is a function of the related photodiode output current due to illumination. This voltage will hereinafter be referred to as the guidepath signal level for photodiodes A, B, C and D and the background noise level for photodiode R. The circuitry for the photodiodes A, B, C, D and R are similar. Thus the output of operational amplifier 22, 24 and 26 represents the guidepath signal of photodiodes B, C and D, respectively. The output of the operational amplifier 28 is representative of the background noise level.

In the next stage of the circuitry, coupled to the output of the operational amplifier 20, the guidepath signal level from each of the operational amplifiers 20, 22, 24 and 26 outputs is compared with the background noise level. More specifically, the output of the operational amplifier 20 is applied to a noninverting input of an operational amplifier 30 by way of a resistor R25. The background noise level from the output of the operational amplifier 28 is applied to an inverting input of the operational amplifier 30. A feedback resistor R37 is coupled between the output of the operational amplifier 30 and the inverting input. A biasing resistor R33 is coupled between the noninverting input of the operational amplifier 30 and the reference voltage G5V. The output of operational amplifier 30 represents the amplified difference between the photodiode A signal level and the background noise level.

The operation of the circuitry for providing a signal representative of the difference between the signal levels of each of the photodiodes B, C and D and the background noise level is similar to the circuitry described for photodiode A. This circuitry provides a difference signal representative of the amplified difference between each of the photodiodes B, C and D signal levels at the outputs of the operational amplifiers 32, 34 and 36, respectively and the background noise level.

After subtracting the background noise level from the signal levels from each of the photodiodes A, B, C and D, the maximum remainder signal is defined as the maximum difference signal which appears on line 40. More specifically, the output of the operational amplifier 30 is applied to the anode of a diode D6. The output of the operational amplifier 32, 34 and 36 are similarly applied to the anodes of diodes D5, D4 and D3, respectively. The cathodes of the diodes D3, D4, D5, D6 are connected together and tied together on line 40. The signal appearing at line 40 is thus the maximum value of the outputs of the operational amplifiers 30, 32, 34 and 36 less the forward voltage drops across either diodes D3, D4, D5, or D6.

In order to account for the forward voltage drop of the diode D3, D4, D5 or D6, circuitry comprising a diode D7, resistors R81, R89, R91, R92 and an operational amplifier 42 is provided. Specifically, the anode of diode D7 is connected to line 40 while the cathode is connected to a resistor R89 which is, in turn, connected to the most negative reference voltage source. The cathode of the diode D7 is also connected to an inverting input of the operational amplifier 42 via a resistor R91. The anode of the diode D7 is coupled to a noninverting input of the operational amplifier 42 by way of a resistor R81. Another resistor R92 is connected between the inverting input of the operational amplifier 42 and the output. The forward voltage drop of either D3, D4, D5, or D6 is compensated for by the forward voltage drop of D7. The output voltage of the operational amplifier 42 thus provides a signal representative of the maximum value of the output voltages of the operational amplifiers 30, 32, 34 or 36. This signal will hereinafter be referred to as the maximum remainder signal.

A portion of the maximum remainder signal is then compared with the signal level from each of the photodiodes A, B, C and D by way of comparators 44, 46, 48 and 50, respectively. Specifically, the maximum remainder signal is applied to the voltage divider network formed by R86 and R90. A portion of the maximum remainder signal is applied to the inverting inputs of operational amplifiers 44, 46, 48 and 50 from the junction of resistors R86 and R90. A feedback resistor R46 is coupled between the output of the operational amplifier 44 and the noninverting input. Similarly feedback resistors R47, R48 and R49 are coupled between the outputs and the noninverting inputs of the operational amplifier 46, 48 and 50. The difference signals from the operational amplifiers 30, 32, 34 and 36 are applied to the noninverting inputs of the comparators 44, 46, 48 and 50, respectively. In operation, if the difference signal is greater than the predetermined percentage of the maximum remainder signal, the output of the comparators 44, 46 48, or 50 will be high or a logical "1" defining a valid guidepath signal for steering. However, if the guidepath signal levels from any of the respective operational amplifiers 30, 32, 34 or 36 is not greater than the predetermined percentage of the maximum remainder signal, then the outputs of the comparators 44, 46, 48 or 50 will be low or a logical "0". Thus, the circuitry heretofore described provides a digital output which indicates whether the guidepath signal is valid for steering.

The output of each of the comparators 44, 46, 48 and 50 is coupled to a light emitting diode LED1, LED2, LED3 and LED4, which, in turn, are coupled to amplifiers 52, 54, 56 and 58 to provide an indication of the presence of a valid guidepath signal for the sensors A, B, C and D, respectively. Whenever the output of any of the comparators 44, 46, 48 or 50 is high, the respective LED will illuminate indicating the presence of a valid guidepath signal on that particular channel.

Rather than locate all the sensors directly over the guidepath line, some sensors are also used to sense the area contiguous to the guidepath. However, the guidepath should be wide enough to lie beneath one or two of the sensors. For example, with a four sensor system, such as that illustrated in the figure, sensors B and C are located to detect the guidepath while sensors A and D are located to detect the area contiguous on both sides of the guidepath. In order to reduce the possibility of operating the vehicle on a random spot of fluorescence, the output values of the amplifiers 52, 54, 56 and 58 may be made to meet a predetermined criteria before a valid guidepath line is declared. One criteria for reducing the possibility of operating the vehicle on a random spot of fluorescence may require a high output from either the B or the C sensor (e.g., comparator 46 and 48) and a low output from either of the A or D sensor (e.g., comparator 44 and 50) before a valid line is declared. Written in a logical equation it reduces to the expression:

$$(B+C) \cdot (\overline{A} + \overline{D}) = 1$$

Such a criteria reduces the possibility of operating the vehicle on a random spot of fluorescence while at the same time minimizes spurious stopping of the vehicle when the vehicle is not precisely centered over the guidepath line.

Another important aspect of the invention relates to the ability of the system to detect the signal-to-noise ratio and stopping the vehicle if the signal-to-noise ratio falls below a predetermined value. The circuitry for detecting the signal-to-noise ratio includes the comparators 38 and 60 and transistors Q1 and Q2. The maximum remainder signal is compared with a percentage of the background noise signal as defined by the voltage divider circuit comprising resistors R83 and R85 and a reference voltage of five volts. Specifically, the background noise level appearing at the output of the operational amplifier 28 is applied to a noninverting input of the comparator 38 by way of a resistor R70. The inverting input of the comparator 38 is connected to a reference voltage by way of a resistor R50. A feedback resistor R80 is connected between the output of the comparator 38 and the inverting input terminal. The output of the comparator 38 is applied to an inverting input of the comparator 60 by way of a resistor R83. A noninverting input of the comparator 60 is connected to a reference voltage of 5 volts by way of a resistor R85. The maximum remainder signal appearing at the output of the operational amplifier 42 is also applied to the non-inverting terminal of the comparator 60. A feedback resistor R84 is connected between the output of the comparator 60 and a noninverting input terminal of the comparator 60. The output signal of the comparator 60 is a logical 1 if the maximum remainder signal exceeds a percentage of the background noise signal indicating that the minimum signal-to-noise ratio has been met.

Circuitry is provided to provide a signal to stop the vehicle if the signal-to-noise ratio falls below a predetermined value. The signal-to-noise ratio signal is applied to the base of a PNP transistor Q1 by way of a resistor 93. A biasing resistor 94 is coupled between the base and the emitter of the transistor Q1. The emitter of the transistor Q1 is also tied to a 15 volt DC voltage source. The collector of the transistor Q1 is applied to a light emitting diode LED 5, which, in turn, is applied to the base of an NPN transistor Q2 by way of a resistor R87. A resistor R88 is connected between the base and emitter of the transistor Q2. Another resistor R95 is connected between the emitter of the transistor Q2 and the cathode of the light emitting diode R95. If the signal-to-noise ratio appearing at the output of the operational amplifier 60 is above the predetermined value, the transistors Q1 and Q2 will turn off.

In operation, once the signal-to-noise ratio drops below the predetermined minimum, a logical "0" from the comparator 60 is applied to the base of the transistor Q1 causing it to turn on. The transistor Q1 in turn drives the transistor Q2 on. The light emitting diode 5 coupled between the transistors Q1 and Q2 will thus conduct when the transistors Q1 and Q2 are on and hence indicate that the signal-to-noise ratio is below the predetermined minimum. When the signal-to-noise ratio is above the predetermined minimum, a logical "1" from the comparator 60 keeps the transistor Q1 off and consequently the transistor Q2 off. The output of signal from the transistor Q2 can thus be used to automatically stop the vehicle when the signal-to-noise ratio falls below a predetermined minimum. The signal-to-noise ratio circuitry as well as the criteria guideline for the sensors reduces the possibility of operating the vehicle during a no-line situation.

Exemplary values for the various components illustrated in FIG. 1 are provided in TABLE I. A system based on those values has been demonstrated to operate well for input signal levels varying from 500 to 1 using off-the-shelf photodetectors and circuit components. The system also performed well with signal-to-noise ratios varying from 1.2 to over 70. Thus, the system is able to operate over a very large dynamic range without the need to make gain or threshold adjustments. The system is also capable of sensing a guidepath beneath all detectors simultaneously without any increase in the signal level from that required to sense the guidepath beneath only a single sensor.

Figure 2:
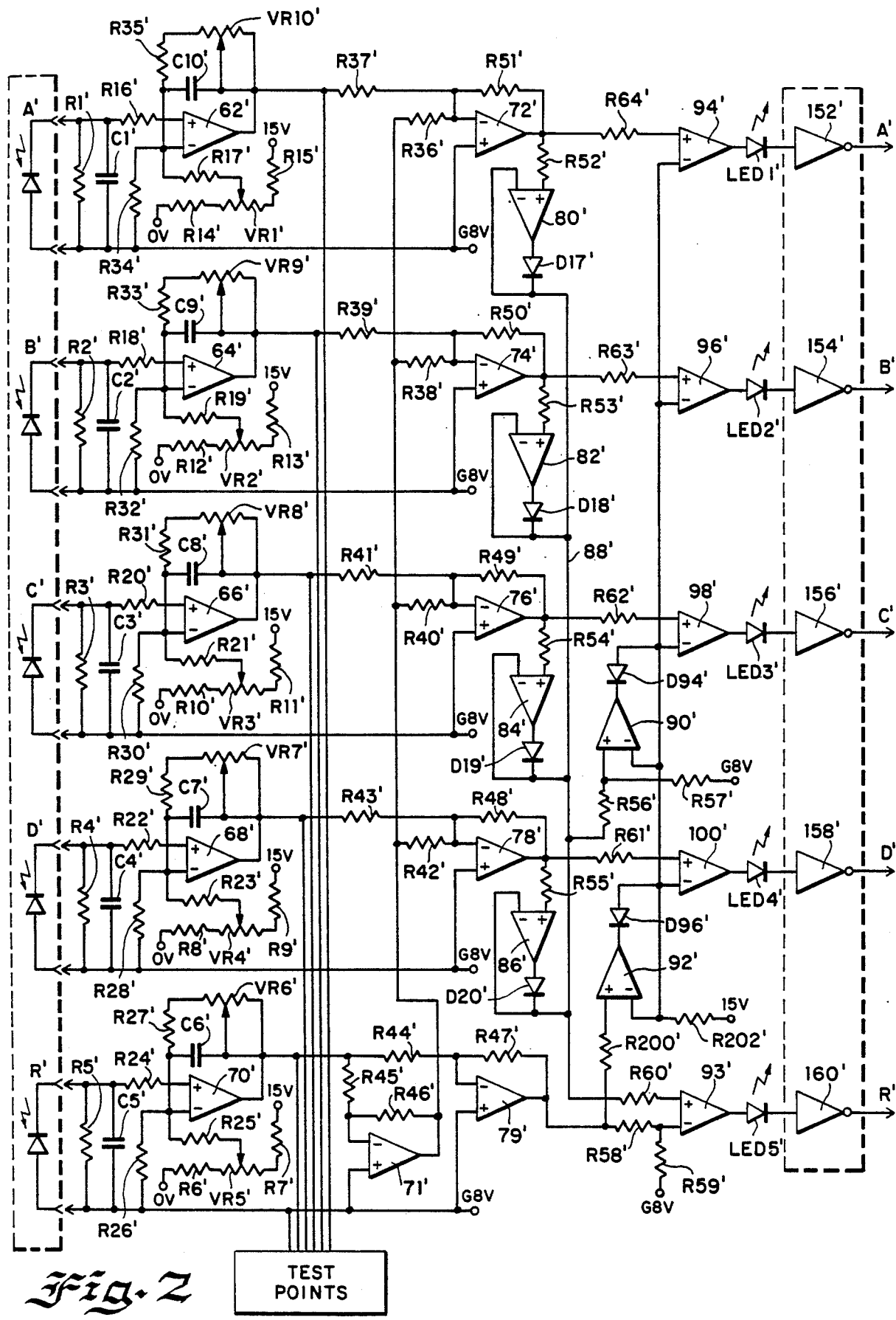
FIG. 2 is a schematic diagram of an alternate embodiment of a signal sensor circuit in accordance with the present invention.

FIG. 2 illustrates an alternate embodiment of the invention. In this embodiment, the circuitry is more tolerant of variations in diode characteristics than the circuit described and illustrated in FIG. 1. Also the criteria for determining whether a valid guidepath signal has been detected is adopted to account for a condition when the guidepath signal is very strong. More specifically, FIG. 2 includes circuitry to select the lesser of a predetermined percentage of the maximum remainder signal or a predetermined percentage of the background noise signal to define a reference signal. Those sensors whose signal level exceeds the value of the reference signal are defined to be a valid guidepath signal.

The predetermined percentage of background signal will be selected as the reference signal primarily when the guidepath lines are very strong to make the detection system more tolerant of variations in strength of a relatively strong guidepath signal. The predetermined percentage of the maximum remainder signal will be selected as the reference signal for relatively weaker guidepath signals.

The first stage of the circuitry, which includes the operational amplifiers 62', 64', 66', 68', and 70', is used to condition the signals from the sensors A', B', C', D' and R', respectively. This circuitry operates similarly to the circuitry described and illustrated in FIG. 1 and is used to balance the "dark" current output from the sensors. In other words, the circuitry allows the output of the operational amplifiers 62', 64', 66', 68' and 70' to be adjusted to zero when there is no light striking the photocells A', B', C', D' and R'. For photocell A, this is accomplished by the voltage divider network which includes the resistors R14' R15' and R17' and the variable resistor VR1'.

The first stage of the circuitry also allows the gain of each of the operational amplifiers 62', 64', 66', 68' and 70' to be adjusted such that the output signal level of each of the operational amplifiers 62', 64', 66', 68' and 70' are relatively equivalent in response to maximum input signals. The circuitry for adjusting the gain includes the resistor R35' and the variable resistor VR10', which are coupled in the feedback loop of the operational amplifier 62'. Similarly, the resistors R33', R31', R29' and R27' and the variable resistors VR9', VR8', VR7' and VR6' are used to adjust the gain of the operational amplifiers 64', 66', 68' and 70'. The output signal from each of the operational amplifiers 62', 64', 66' and 68' is applied to operational amplifiers 72', 74', 76' and 78', respectively. Also applied to the operational amplifiers 72', 74', 76' and 78', is a signal from the operational amplifier 70', which is representative of the background noise signal. The background signal from the operational amplifier 70' is applied to an operational amplifier 71'. The output signal from the operational amplifier 71' is applied to an inverting input of each of the operational amplifiers 72', 74', 76' and 78' The output of each of the operational amplifiers 72', 74', 76' and 78' thus represents a signal representative of the difference between the sensor signal level and the background noise signal level. These difference signals are applied to a noninverting input of operational amplifiers 80', 82', 84' and 86', respectively, by way of resistors R52', R53', R54' and R55'

Diodes D17', D18', D19' and D20' are connected to the outputs of operational amplifiers 80', 82', 84' and 86', respectively, so that the cathodes are all connected together on line 88 Each cathode is also connected to an inverting input of the operational amplifiers 80', 82', 84' and 86'. The anodes are connected to the respective outputs of the operational amplifiers 80', 82', 84' and 86'. A maximum remainder signal which represents the maximum difference signal will appear on line 88.

The circuitry which includes the operational amplifiers 90' and 92' and the diodes D94' and D96' selects the lesser value of the predetermined percentage of the maximum remainder signal or the background noise signal to define a reference signal to be used to determine if a valid guidepath signal has been detected. More specifically, the maximum remainder signal from line 88 is applied to a noninverting input of an operational amplifier 90' by way of a voltage divider network which includes the resistors R56' and R57'. The cathode of a diode D94' is connected to the output of the operational amplifier 90'. The anode of the diode D94' is connected to an inverting input of the operational amplifier 90'. The output signal from the operational amplifier 90' represents a predetermined percentage of the maximum remainder signal.

The background signal from the operational amplifier 70' is also applied to an inverting input of an operational amplifier 79'. The noninverting input is tied to a signal ground G8V. A feedback resistor R47' is tied between the output of the operational amplifier 79' and the inverting input. The output of the operational amplifier 79' is applied to an inverting input of a comparator 93' by way of a voltage divider circuit which includes the resistors R58' and R59'. The maximum remainder signal from line 88 is applied to a noninverting input of a comparator 93' by way of a resistor R60'. The output signal from the comparator 93' indicates whether the signal-to-noise ratio is below a predetermined minimum value. The output signal from the comparator 93' is applied to an LED5' which in turn is applied to an amplifier 160 to provide a signal representative that the signal-to-noise ratio is below a predetermined value.

The background signal from the operational amplifier 79' is also applied to a noninverting input of the comparator 92' by way of a resistor R200'. The output of the comparator 92' represents a predetermined percentage of the background noise signal A diode D96' is connected such that its cathode is connected to the output of the comparator 92' and its cathode is connected to an inverting input of the comparator 92'. The anode of the diode D96' is also connected to the anode of a diode D94' and to a source of 15 volts by way of a pull-up resistor R202.

The circuitry, which includes the comparators 90' and 92' and the diodes D94' and D96' selects the lesser of a predetermined percentage of the maximum remainder signal or a predetermined percentage of the background noise signal to define the reference signal. The reference signal is then applied to inverting inputs of the comparators 94', 96', 98' and 100', respectively. The outputs of the operational amplifiers 72', 74', 76' and 78', are applied to the noninverting inputs of the comparators 94', 96', 98' and 100', respectively, by way of resistors R64', R63', R62' and R61'. Those signal levels which exceed the reference signal will appear at the outputs of the comparators 94', 96', 98' and 100' and are defined as valid guidepath signals. The output of the comparators 94', 96', 98' and 100' are applied to light emitting diodes LED1', LED2', LED3' and LED4', respectively, which are illuminated when a valid guidepath has been detected. The outputs of the respective LEDs are applied to amplifiers 152', 154', 156' and 158' to be used as steering signals.

Thus, it should be apparent that a unique guidance system has been disclosed for detecting the presence of a guidepath. As heretofore discussed the system can be implemented in a number of ways such as with radio frequency, ultrasound or infrared light sensors, all of which are contemplated to be within the scope of the appended claims.

TABLE I

R = Resistors
R1 = 1M
R2 = 1M
R3 = 1M
R4 = 1M
R6 = 1M
R6 = 1M

TABLE I-continued

R7 = 1M
R8 = 1M
R9 = 1M
R10 = 1M
R11 = 10K
R12 = 10K
R13 = 10K
R13 = 10K
R14 = 10K
R15 = 10K
R16 = 10K
R17 = 10K
R18 = 10K
R19 = 10K
R20 = 10K
R21 = 10K
R22 = 10K
R23 = 10K
R24 = 10K
R25 = 10K
R26 = 10K
R27 = 10K
R28 = 10K
R29 = 1K
R30 = 1K
R31 = 1K
R32 = 1K
R33 = 100K
R34 = 100K
R35 = 100K
R36 = 100K
R37 = 100K
R38 = 100K
R39 = 100K
R40 = 100K
R41 = 330K
R42 = 330K
R43 = 330K
R44 = 330K
R45 = 330K
R46 = 2.2M
R47 = 2.2M
R48 = 2.2M
R49 = 2.2M
R50 = 10K
R70 = 10K
R80 = 90K
R81 = 1M
R82 = 4.7K
R83 = 10K
R84 = 10M
R85 = 2.2K
R86 = 10K
R87 = 10K
R88 = 2.7K
R89 = 10K
R90 = 22K
R91 = 1M
R92 = 1M
R93 = 10K
R94 = 2.7K
R95 = 1.2K
C = Capacitors
C1 = 4700$_p$F
C2 = 4700$_p$F
C3 = 4700$_p$F
C4 = 4700$_p$F
C5 = 4700$_p$F
C6 = .01uF
C7 = .01uF
C8 = .01uF
C9 = .01uF
C10 = .01uF
VR = Variable Resistors
VR1 = 50K
VR2 = 50K
VR3 = 50K
VR4 = 50K
VR5 = 50K
VR6 = 100K
VR7 = 100K
VR8 = 100K TABLE I-continued

VR9 = 100K
VR10 = 100K

What is claimed and desired to be secured by Letters Patent of the United States is:

1. A system for an automatically guided vehicle for detecting the presence of a fluorescent material defining a guidepath comprising:
   means for providing a first signal representative of said fluorescent guidepath including one or more optical sensors disposed on said vehicle, wherein not all of said sensors are located over said guidepath and an ultraviolet light for irradiating the fluorescent material causing it to emit visible light;
   means for detecting background noise;
   means responsive to said first signal providing means and said background noise detecting means for providing a signal according to a predetermined criteria indicative of a valid guidepath; and
   means responsive to said plurality of optical sensors and said background noise detecting means for providing a signal representative of the maximum value of the differences between each of the optical sensor signals and the background noise signal to define a maximum remainder signal.

2. A system as recited in claim 1 further including means responsive to first signal generating means and said maximum remainder signal for comparing the output signals from each optical sensor with a predetermined percentage of said maximum remainder signal and generating a valid guidepath signal for each sensor if said output signal from said sensor exceeds said maximum remainder signal by a predetermined amount.

3. A system as recited in claim 2 wherein said valid guidepath signal is a digital signal.

4. A system as recited in claim 1 wherein said first signal providing means includes four sensors, A, B, C and D.

5. A system as recited in claim 4 wherein only two of the sensors, B and C are located to sense light emitted from said guidepath.

6. A system as recited in claim 5 wherein said predetermined criteria between the output signals from said sensors is given by the following relationship:

$$(B+C)\cdot(\bar{A}+\bar{D})=1.$$

7. A vehicle guidance system as recited in claim 1 further including means for determining the signal-to-noise ratio for the signals from said first signal generating means and stopping the vehicle when the signal-to-noise ratio falls below a predetermined value.

8. A method for detecting a guidepath having a detectable characteristic for an automatically guided vehicle comprising the steps of:
   detecting first signals representative of a said detectable characteristic with a plurality of sensors;
   detecting signals representative of background noise;
   subtracting the background noise signal from said first signals for each sensor and selecting the maximum difference signal to define a maximum remainder signal;
   comparing the first signal from each sensor with a percentage of the maximum remainder signal;
   providing a valid guidepath signal for each sensor whose first signal level exceeds a percentage of the maximum remainder signal; and
   generating a valid guidepath signal if a predetermined relationship exists among the first signals from said plurality of sensors.

9. A method for detecting a guidepath as in claim 8 wherein four sensors A, B, C and D, are used and wherein only two of the sensors, B and C, are located to detect the guidepath and two of the sensors are adapted to detect areas contiguous to the guidepath.

10. A method for detecting a guidepath as recited in claim 9 wherein said predetermined relationship between the output signals from said sensors is given by the logical expression:

$$(B+C)\cdot(\bar{A}+\bar{D})=1.$$

11. A system for an automatically guided vehicle for detecting the presence of a fluorescent material defining a guidepath comprising:
   an ultraviolet light for irradiating the fluorescent material causing it to emit visible light;
   a plurality of photodetectors for detecting the light emitted from said fluorescent material;
   a photodetector for providing a signal representative of the background light;
   means for subtracting said signal representative of the background light from the signals from each of said photodetectors defining a plurality of difference signals;
   means for selecting the maximum difference signal to define a maximum remainder signal; and
   means for comparing the signal from each photodetector with a percentage of said maximum remainder signal and providing a valid guidepath signal for each photodetector whose signal exceeds a percentage of said maximum remainder signal.

12. A guidance system as recited in claim 11 further including means for comparing the background noise signal and said maximum remainder signal for providing a signal representative of the signal-to-noise ratio.

13. A guidance system as recited in claim 12 further including means responsive to said signal representative of the signal-to-noise ratio for stopping the vehicle if the signal-to-noise ratio is below a predetermined value.

14. A system for an automatically guided vehicle for detecting the presence of a guidepath having a detectable characteristic comprising:
   a plurality of sensors for providing a first signal representative of said detectable characteristic;
   a sensor for providing a signal representative of the background noise;
   means for subtracting the signal representative of the background noise from each of the sensor signals defining a plurality of difference signals;
   means for selecting the maximum difference signal to define a maximum remainder signal;
   means for comparing said maximum remainder signal with said background noise signal to define a signal representative of exceeding a minimum the signal-to-noise ratio; and
   means responsive to said signal-to-noise ratio representative signal to stop the vehicle if the signal-to-noise ratio representative signal is less than a predetermined amount.

15. A method for detecting a guidepath having a detectable characteristic for an automatically guided vehicle comprising the steps of:

detecting first signals representative of said detectable characteristic with a plurality of sensors;

detecting signals representative of background noise;

subtracting the background noise signal from each of said first signals and selecting the maximum difference signal to define a maximum remainder signal;

selecting the lesser of a predetermined percentage of the maximum remainder signal and a predetermined percentage of the background noise signal to define a reference signal; and providing a valid guidepath signal for each first signal level that exceeds the reference signal.

16. A guidance system for an automatically guided vehicle for detecting the presence of a fluorescent guidepath comprising:

an ultraviolet light for irradiating the fluorescent material causing it to emit visible light;

a plurality of photodetectors for providing a signal when light emitted from said fluorescent material is detected;

a photodetector for providing a signal representative of the background light;

means for subtracting said signal representative of the background light from each of said photodetector signals to define a plurality of difference signals;

means for selecting the maximum difference signal to define a maximum remainder signal;

means for selecting the lesser of a predetermined percentage of said maximum remainder signal and the background noise signal to define a reference signal; and means for comparing the signals from each of said photodetectors with said reference signal and providing a valid guidepath signal for each photodetector whose signal exceeds said reference signal.

17. A system for an automatically guided vehicle for detecting the presence of a guidepath having a detectable characteristic comprising:

a plurality of sensors for providing a first signal representative of said detectable characteristic;

a sensor for providing a signal representative of the background noise;

means for subtracting the signal representative of the background noise from each of the sensor signals defining a plurality of difference signals;

means for selecting the maximum difference signal to define a maximum remainder signal;

means for selecting the lesser value of a predetermined percentage of the maximum remainder signal and a predetermined percentage of said background noise signal to define a reference signal; and means for comparing the reference signal with said sensor signals to provide a valid guidepath signal for those sensors whose signal exceeds said reference signal.

* * * * *